United States Patent
Meguro et al.

(10) Patent No.: US 6,307,712 B1
(45) Date of Patent: Oct. 23, 2001

(54) ASSEMBLY FOR DISCRIMINATION DISC STORAGE CAPACITY IN A DISC CARTRIDGE

(75) Inventors: Hiroshi Meguro, Miyagi; Hideaki Kumagai; Yasushi Fujita, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/402,193
(22) PCT Filed: Mar. 31, 1998
(86) PCT No.: PCT/JP98/01491
§ 371 Date: Dec. 20, 1999
§ 102(e) Date: Dec. 20, 1999
(87) PCT Pub. No.: WO98/45843
PCT Pub. Date: Oct. 15, 1998

(30) Foreign Application Priority Data

Apr. 4, 1997 (JP) .................................................. 9-086549

(51) Int. Cl.[7] .................................................. G11B 23/033
(52) U.S. Cl. ............................................................ 360/133
(58) Field of Search .............................. 360/133; 369/291

(56) References Cited

U.S. PATENT DOCUMENTS

| | | | |
|---|---|---|---|
| 4,908,817 | * 3/1990 | Sandell et al. | 369/291 |
| 5,091,815 | * 2/1992 | Suzuki | 360/133 |
| 5,886,859 | * 3/1999 | Oishi | 360/133 |
| 5,940,255 | * 8/1999 | Uwabo et al. | 360/133 |
| 5,995,344 | * 11/1999 | Fukuda et al. | 360/133 |

FOREIGN PATENT DOCUMENTS

| | | | |
|---|---|---|---|
| 0 500 271 A2 | * 8/1992 | (EP) . | |
| 0 974 965 A1 | * 1/2000 | (EP) . | |
| 7-176092 | * 7/1995 | (JP) . | |
| 9-7345 | 1/1997 | (JP) . | |
| 9-63241 | * 3/1997 | (JP) . | |
| 9-306143 | * 11/1997 | (JP) . | |
| 9-330578 | * 12/1997 | (JP) . | |
| 10-11936 | * 1/1998 | (JP) . | |
| 10-3774 | * 1/1998 | (JP) . | |
| 10-3775 | * 1/1998 | (JP) . | |

* cited by examiner

Primary Examiner—William Klimowicz
(74) Attorney, Agent, or Firm—Frommer Lawrence & Haug LLP; William S. Frommer; Matthew K. Ryan

(57) ABSTRACT

A disc cartridge holding a flexible magnetic disc with a recording capacity exceeding 100 MB. The disc cartridge includes a main cartridge body portion holding a disc-shaped recording medium of an increased capacity, first and second positioning reference holes formed at left and right corners in the lower surface of the main cartridge body portion encircled by the front wall section in the direction of insertion of the main cartridge body portion into a disc drive device, left and right sidewall sections extending perpendicular to the front wall section and the outer rim of the disc-shaped recording medium housed in the main cartridge body portion. The disc cartridge includes a first capacity discriminating hole and a mistaken recording inhibiting unit provided at left and right corners encircled by the back side wall section of the main cartridge body portion, left and right sidewall sections extending perpendicular to the back side wall section and the outer rim of the disc-shaped recording medium housed in the main cartridge body portion and a second capacity discriminating hole towards the outer rim of the disc-shaped recording medium housed in the main cartridge body portion in proximity to the first positioning reference hole. The portions detected by the detection switches are arranged distributed on the lower surface of the main cartridge body portion in order to detect reliably the state of the disc cartridges such as the sorts of the magnetic discs.

6 Claims, 10 Drawing Sheets

ASSEMBLY FOR DISCRIMINATION DISC STORAGE CAPACITY IN A DISC CARTRIDGE

TECHNICAL FIELD

This invention relates to a disc cartridge housing therein a disc employed as a recording medium for information signals. More particularly, it relates to a disc cartridge having its outer shape substantially in common with other sorts of disc cartridges with different recording capacities and yet capable of distinguishment from these other disc cartridges by a discrimination hole.

BACKGROUND ART

Up to now, a disc cartridge has been in use which holds a flexible magnetic disc as a disc used as a recording medium for information signals. This flexible magnetic disc is hereinafter referred to as a magnetic disc.

As a disc cartridge holding a magnetic disc, a first disc cartridge holding a magnetic disc having a recording capacity of 1 megabyte (MB) and a second disc cartridge holding a magnetic disc having a recording capacity of 2 megabyte (MB) are currently in use. The second disc cartridge, housing the 2 MB magnetic disc, is standardized as MF2HD.

These first and second disc cartridges have the thickness, outer size and the structure of a shutter used for opening/closing an recording and/or reproducing aperture formed in a main cartridge body portion in common for enabling the use of a common disc drive device interchangeably.

A first disc cartridge 1, holding a magnetic disc of a recording capacity of 1 MB, and a second disc cartridge 2, holding a magnetic disc of a recording capacity of 2 MB, are each provided with a main cartridge body portion 5 and a magnetic disc 6 with a diameter of 3.5 inch rotatably housed in the main cartridge body portion 5, as shown in FIGS. 1 to 4. The main cartridge body portion 5 is made up of a rectangular-shaped upper cartridge half 3 and a rectangular-shaped lower cartridge half 4 abutted and connected to each other.

The magnetic disc 6, held in the main cartridge body portion 5, is fitted with a center hub 7 formed as a magnetic metal plate and which is adapted for being clamped to a disc table of a disc rotating/driving unit provided on a disc driving device. This hub 7 is exposed to outside via a center aperture 8 bored in the lower cartridge half 4 of the main cartridge body portion 5.

The outer four sides of the rectangular-shaped main cartridge body portion 5 are constituted by a front wall section 9, a back side wall section 10 and left and right sidewall sections 11, 12. The front wall section 9 serves as the inserting side end of the main cartridge body portion 5 into the disc driving device as indicated by arrow A in FIGS. 1 to 4. The back side wall section 10 is the side lying opposite to the front wall section 9 and which operates as an ejection leading end when ejecting the main cartridge body portion 5. In a corner on the front wall section 9 of the main cartridge body portion 5 is formed a mistaken insertion inhibiting unit 13 operating as an inclined surface for preventing mistaken insertion of the disc cartridge into the disc driving device.

The upper and lower surfaces of the main cartridge body portion 5, provided by the upper and lower cartridge halves 3 and 4, are formed with rectangular-shaped recording and/or reproducing apertures 14 and 15, at mid portions thereof in the left-and-right direction, for exposing a portion of a signal recording area of the magnetic disc 6 held in the main cartridge body portion 5 to outside across the inner and outer rims of the magnetic disc 6.

On the main cartridge body portion 5 is movable mounted a shutter member 17 adapted for opening/closing recording and/or reproducing apertures 14, 15 provided in the main cartridge body portion 5. The shutter member 17 is U-shaped in cross-section section and is fitted on the front wall section 9 of the main cartridge body portion 5 for overlying the recording and/or reproducing apertures 14, 15 formed in the main cartridge body portion 5. The shutter member 17 is biased by a torsion coil spring, not shown, provided in the main cartridge body portion 5, into movement in a direction of closing the recording and/or reproducing apertures 14, 15 as indicated by arrow D in FIGS. 1 to 4.

The main cartridge body portion 5 is also provided with a shutter movement recess 18, defining a movement area for the shutter member 17, for extending from the upper and lower sides to the front wall section 9. The main cartridge body portion 5 is also provided with a label bonding recess 19 extending from a mid portion on the upper surface to the back side wall section 10 and thence to the lower surface of the main cartridge body portion 5.

In both corner areas on the lower surface of the main cartridge body portion 5 surrounded by the front wall section 9, both sidewall sections 11, 12 and the outer rim of the magnetic disc 6 housed in the main cartridge body portion 5, in the inserting side into the disc drive device, and in both corner portions on the lower surface of the main cartridge body portion 5 surrounded by the back wall section 10, both sidewall sections 11, 12 and the outer rim of the magnetic disc 6 housed in the main cartridge body portion 5, on the ejecting side from the disc drive device, there are formed height reference planes 21, 22, first and second positioning reference holes 23, 24 and a mistaken recording inhibiting unit 26, as shown in FIGS. 2 and 4. The height reference planes 21, 22 serve for setting the mounting height level when the first or second disc cartridge 1 or 2 is loaded on the disc drive device. The first and second positioning reference holes 23, 24 are engaged by positioning pins provided on the disc drive device for setting the horizontal mounting position.

The lower side of the second disc cartridge 2 is also formed with a first capacity discrimination hole 27 in the opposite side corner towards the back side wall section 10 for specifying that the magnetic disc 6 with the recording capacity of 2 MB has been housed therein, as shown in FIG. 4.

Further, in the left and right sidewall sections, 11, 12 towards the front wall section 9 of the main cartridge body portion 5, there are formed engagement recesses 25, 25 engaged by engagement portions of a loading mechanism for the disc cartridge provided on the disc drive device, as shown in FIGS. 2 and 4.

Specifically, in the four corner portions on the lower surface of the main cartridge body portion 5, there are formed four left and right paired height reference planes 21, 22 so as to clear the shutter movement recess 18 and the label bonding recess 19. Within the left and right paired height reference planes 21, 22 towards the front wall section 9 of the main cartridge body portion 5 are symmetrically formed first and second positioning reference holes 23, 24 in the left-and-right direction. The first positioning reference hole 23 is of a true circular shape, while the second positioning reference hole 24 is of an elliptical shape having the direction perpendicular to the inserting direction of the first and second disc cartridges 1, 2 into the disc drive device as its long axis.

The engagement recesses 25, 25 are formed to a semicircular profile in corner portions towards the front wall section 9 of the main cartridge body portion 5 with left-and-right position symmetry, as shown in FIGS. 2 and 4. These engagement recesses 25, 25 are provided between the front wall section 9 and the left and right paired positioning reference holes 23, 24 of the main cartridge body portion 5 and are formed for extending from the lower surface to the sidewall sections, 11, 12 of the main cartridge body portion 5.

The mistaken recording inhibiting unit 26 is provided between the back side wall section 10 and the height reference plane 22 of the main cartridge body portion 5, and includes a recording inhibition discriminating hole 26a and a mistaken recording inhibiting member 26b. The recording inhibition discriminating hole 26a is passed through the upper and lower halves 3, 4 of the main cartridge body portion 5 and the mistaken recording inhibiting member 26b is movably assembled between the upper and lower halves 11, 12 for opening/closing the recording inhibition discriminating hole 26a.

The first disc cartridge 1, holding the magnetic disc 6 with the recording capacity of 1 MB, is not provided with a capacity discriminating portion for specifying the type of the magnetic disc 6 housed therein, as shown in FIGS. 1 and 2. Conversely, the second disc cartridge 2, holding the magnetic disc 6 with the recording capacity of 2 MB, is provided with the first capacity discrimination hole 27 specifying that the magnetic disc 6 with the recording capacity of 2 MB is housed therein, as shown in FIGS. 3 and 4. The first capacity discrimination hole 27 is provided at a corner towards the lateral surface 11 towards the back side wall section 10 of the main cartridge body portion 5, as shown in FIGS. 3 and 4. The first capacity discrimination hole 27 is formed as a rectangular-shaped through-hole traversing the upper and lower cartridge halves 3, 4 in left-and-right symmetry with respect to the recording inhibition discriminating hole 26a of the mistaken recording inhibiting unit 26.

A disc drive device 30, on which the above-described first and second disc cartridges 1, 2 are mounted selectively interchangeably, is comprised of a base block 32 of a metal plate arranged in a main body portion 31 and a cartridge loading unit 33 mounted on the base block. The first or second disc cartridge 1 or 2 is adapted to be loaded on the cartridge loading unit 33. The disc drive device 30 is also provided with a disc rotating/driving unit 34 at a mid portion of the cartridge loading unit 33. The disc rotating/driving unit 34 is adapted for rotationally driving the magnetic disc 6 housed within the first and second disc cartridges 1, 2. The disc rotating/driving unit 33 include a spindle motor 35 mounted on the base block 32 and a disc table 36 mounted as-one with a spindle shaft 35a of the spindle motor 35.

On the base block 32, there are provided supports 39, 40 adapted for supporting the height reference planes 21, 21 on the rim of the first or second positioning reference holes 23, 24 of the first or second disc cartridges, 1,2 loaded on the cartridge loading unit 33 and the height reference planes 22, 22 towards the back side wall section 10. These supports 39, 40 are arranged with left-and-right symmetry for surrounding the spindle motor 35 about the spindle shaft 35a as the center. These supports 39, 40 are formed by bosses by partially segmenting the base block 32 or by pins set upright on the base block 32.

Centrally of the supports 39, 39, supporting the height reference planes 21, 21 on the rim of the first and second positioning reference holes 23, 24 of the first or second disc cartridge 1 or 2 are set upright positioning pins 37, 38 engaged with the first and second positioning reference holes 23, 24 for setting the horizontal loading position of the first or second disc cartridge 1 or 2 with respect to the cartridge loading unit 33, as shown in FIG. 6. These positioning pins 37, 38 are tapered as shown in FIG. 6.

On the base block 32, there are arranged a cartridge loading detection switch 44 and a mistaken recording detection switch 45 on a cartridge inserting/detachment opening 43 on the front side of the main body portion 31 and towards a lateral side 31a of the main body portion 31 for detecting the loading of the first or second disc cartridge 1 or 2 on the cartridge loading unit 33. Towards the opposite side lateral wall section 31b is arranged a first capacity detection switch 46.

The mistaken recording detection switch 45 and the first capacity detection switch 46 are arranged with left-and-right symmetry on both sides of the spindle shaft 35a of the spindle motor 35, as shown in FIG. 5. Towards the first capacity detection switch 46 in proximity to the mistaken recording detection switch 45 is mounted a cartridge loading detection switch 44. The switches 44 to 46 are of the thrusting type and mounted on a printed circuit board 48 provided on the lower surface of the base block 32, as shown in FIG. 6. These switches 44 to 46 are provided with thrusting elements 44a, 45a, 46a, respectively, which are protruded towards the cartridge loading unit 33 provided on the upper surface of the base block 32 via an aperture 49 formed in the base block 32.

On an inner end of the printed circuit board 48 is provided a connection terminal 50 connected to a connection plug interconnecting the disc drive device and an external processing device, such as a computer, as shown in FIG. 5.

The first and second disc cartridges 1, 2 are loaded on the disc drive device 30, configured as described above, for recording and/or reproducing information signals on or from the magnetic disc 6 held in the main cartridge body portion 5.

The first or second disc cartridge 1 or 2 is inserted in a horizontal position into the main body portion 31 via cartridge inserting/detachment opening 43 in a direction indicated by arrow A in FIG. 5, with the front wall section 9 of the main cartridge body portion 5 carrying the shutter member 17 as the inserting end. When the first or second disc cartridge 1 or 2 is inserted into the main body portion 31, the shutter member 17 is moved in the direction indicated by arrow C in FIG. 5, by the cartridge loading unit provided in the main body portion 31, against the force of the torsion coil spring, for opening the recording and/or reproducing apertures 14, 15. When inserted as far as the position facing the cartridge loading unit 33, the first or second disc cartridge 1 or 2 is lowered towards the recording/reproducing position of recording and/or reproducing information signals on or from the magnetic disc 6, so that it has the height reference planes 21, 22 supported by the supports 39, 40, while having the positioning pins 37, 38 engaged in the first and second positioning reference holes 23, 24 so as to be loaded in correct height and horizontal positioning on the cartridge loading unit 33. At this time, the magnetic disc 6 held in the main cartridge body portion 5 has its hub 7 chucked on and rotated in unison with the disc table 36. Into the recording and/or reproducing apertures 16 in the upper and lower sides of the main cartridge body portion 5, opened as a result of movement of the shutter member 17, upper and lower paired magnetic heads, not shown, are intruded into contact with the upper and lower surfaces of the magnetic disc 6. As the magnetic disc 6 is run in rotation by the spindle motor 35, information signals are recorded or reproduced on or from the upper and lower sides of the magnetic disc 6 by the paired magnetic heads.

Turning to the disc drive device 30, when the first or second disc cartridge 1 or 2 is loaded on the cartridge loading unit 33, the thrusting elements 44a, 45a, 46a of the cartridge loading detection switch 44, mistaken recording detection switch 45 and the first capacity detection switch 46 are selectively actuated by the lower surface of the main cartridge body portion 5 in order to detect whether or not the disc cartridge 1 or 2 has been loaded, whether or not the information signals can be recorded on the magnetic disc 6 and which is the recording capacity of the magnetic disc 6 housed in the loaded disc cartridge 1 or 2. That is, if the recording inhibiting hole 26a of the mistaken recording inhibiting unit 26 is closed by the mistaken recording inhibiting member 26b, the thrusting element 45a is thrust by the mistaken recording inhibiting member 26b to turn on the mistaken recording detection switch 45, thus allowing to recognize the 'recordable state' in which the information signals can be recorded on the magnetic disc 6. If the recording inhibition discriminating hole 26a is opened, the thrusting element 45a is not intruded into the recording inhibiting hole 26a without being thrust, with the mistaken recording detection switch 45 continuing to be turned off to allow to recognize the 'recording inhibiting state' in which recording of information signals on the magnetic disc is inhibited. When the first disc cartridge 1 is loaded on the cartridge loading unit 33, the thrusting element 46a is thrust by the planar lower surface of the main cartridge body portion 5 to turn on the first capacity detection switch 46, thus allowing to recognize that there is loaded the first disc cartridge 1 holding the magnetic disc 6 with the recording capacity of 1 MB.

When the second disc cartridge 2 holding the magnetic disc 6 with the recording capacity of 2 MB is loaded on the disc drive device 30, the cartridge loading detection switch 44 and the mistaken recording detection switch 45 effect the same detection operation as that when the first disc cartridge 1 is loaded. However, the thrusting element 46a is intruded into the first capacity discrimination hole 27 without being thrust. The first capacity detection switch 46 continues to be turned off to allow to recognize the loading of the second disc cartridge 2 holding the magnetic disc 6 of the 2 MB recording capacity.

Thus, the first capacity detection switch 46 detects the possible presence of the first capacity discrimination holes 27 of the first and second disc cartridges 1, 2 for detecting the types of the loaded disc cartridges 1, 2.

Meanwhile, with a disc cartridge holding a flexible magnetic disc, the recording capacity is raised to, for example, not less than 100 MB. With the disc cartridge of this type which holds the magnetic disc of the increased recording capacity, it has been desired to use the disc cartridge in a disc drive device interchangeably in common with the above-mentioned first and second disc cartridges and simultaneously to enable distinguishment from the first and second disc cartridges 1, 2 and recognition of the recording capacity of the magnetic disc held in the main cartridge body portion.

For distinguishment of the disc cartridge holding a magnetic disc having an increased recording capacity of not less than 100 MB from the first disc cartridge 1 holding the 1 MB capacity magnetic disc 6 and the second disc cartridge 2 holding the 2 MB capacity magnetic disc 6, interchangeable with the disc cartridge holding the magnetic disc of the increased capacity, it may be contemplated to provide a second capacity distinguishing hole for distinguishing the increased capacity independently of the first capacity discrimination hole 27 provided in the second disc cartridge 2, and to detect the possible presence of the second capacity discriminating hole by a large capacity discriminating detection switch provided in the disc drive device in the same way as by the first capacity discrimination hole 27 provided in the second disc cartridge 2. However, in this case, special considerations need to be made as to the position of the second capacity discriminating hole.

Specifically, in the currently used disc drive device 30, selectively employing only the first and second disc cartridges 1, 2, there is provided a thrusting spring in the cartridge loading unit, as shown in FIG. 6. This thrusting spring thrusts the first and second disc cartridges 1, 2 loaded on the cartridge loading unit 33 towards the supports 39, 40 provided on the cartridge loading unit 33. The comprehensive pressing force $F_1$ of the thrusting spring, pressing the main cartridge body portion 5 against the supports 39, 40 in their entirety, is usually 300 to 400 g, with the distributed pressing force acting on the four supports 39, 40 being of the order of one-fourth the comprehensive pressing force $F_1$, or 90 to 100 g.

The thrusting force $F_3$ of each of the thrusting elements 44a, 45a, 46a of the cartridge loading detection switch 44, mistaken recording detection switch 45 and the first capacity detection switch 46, provided on the disc drive device 30, is approximately 36 g. Therefore, if three or more thrusting type detection switches each having a thrusting element are provided in proximity to one another in the vicinity of one of the supports 40, for example, of the four supports 39, 40, the sum total of the thrusting forces $F_3$ thrusting the thrusting elements of these three or more detection switches, that is an overall thrusting force $F_4$, needs to exceed 108 g, thus exceeding the upper limit of the distributed pressing force $F_2$ applied to the sole support 40. This leads to the cartridge floating phenomenon, in which the main cartridge body portion 5 is floated upward from the sole support 40 by the overall force $F_4$ with which the thrusting elements of the detection switches act for displacing the main cartridge body portion 5 away from the cartridge loading unit 33 against the bias of the thrusting spring.

On the occurrence of such cartridge floating phenomenon, there results the failure in chucking the magnetic disc 6 with respect to the disc table 36 or in the rotational driving of the magnetic disc 6 by the spindle motor 6. Moreover, with the recent tendency to a reduced thickness of the disc drive device 30, the detection switches also tend to be reduced in size, with the result that the thrusting elements provided on the detection switches also tend to be reduced in movement strokes. If the floating phenomenon occurs from the cartridge loading unit 33 of the disc cartridge 1 or 2, it may be feared that detection of possible loading of the disc cartridge 1 or 2 on the cartridge loading unit 33 or of the possibility of recording of information signals on the magnetic disc 6, or discrimination of the types of the loaded disc cartridge, such as the recording capacity, cannot be achieved reliably.

The track width of the recording tracks for the information signals, formed on the magnetic disc having the recording capacity of not less than 100 MB, is much narrower than the track width of the recording track formed on the magnetic disc with the recording capacity of 1 MB or 2 MB. Thus, if the disc cartridge holding the magnetic disc of the increased capacity and narrow track width is erroneously loaded in a disc drive device exclusively employing the above-mentioned first and second disc cartridges holding the magnetic discs with the recording capacity of 1 or 2 MB, the risk is high that the information recorded on the magnetic disc of the increased capacity be erased by the magnetic head adapted for recording the information signals on the magnetic disc with the recording capacity of 1 or 2 MB.

It is therefore mandatory that, if a disc cartridge holding the magnetic disc of the increased capacity is erroneously loaded on a disc drive device dedicated to the first and second disc cartridges holding the magnetic discs of the recording capacity of 1 or 2 MB, the 'non-recordable state' can be recognized at all times.

DISCLOSURE OF THE INVENTION

It is an object of the present invention to provide a novel disc cartridge which enables correct distinguishment from the conventional first and second disc cartridges holding the magnetic discs with the recording capacity of 1 MB or 2 MB.

It is another object of the present invention to provide a disc cartridge in which the disc cartridge holding a disc of an increased capacity can be correctly discriminated to enable correct recording and/or reproduction of information signals in accordance with the recording capacity of the disc.

It is yet another object of the present invention to provide a disc cartridge holding a disc of an increased capacity in which, even if the disc cartridge is erroneously inserted into a disc drive device employing only a first disc cartridge holding a magnetic disc of a recording capacity of 1 MB or a second disc cartridge holding a magnetic disc of a recording capacity of 2 MB, the information signals recorded on the disc can be protected reliably without the risk of inadvertent erasure.

The present invention provides a disc cartridge including a main cartridge body portion holding a disc-shaped recording medium of an increased capacity, first and second positioning reference holes formed at left and right corners in the lower surface of the main cartridge body portion encircled by the front wall section in the direction of insertion of the main cartridge body portion into a disc drive device, left and right sidewall sections extending perpendicular to the front wall section and by the outer rim of the disc-shaped recording medium housed in the main cartridge body portion, a first capacity discriminating hole and a mistaken recording inhibiting unit provided at left and right corners encircled by the back side wall section of the main cartridge body portion, left and right sidewall sections extending perpendicular to the back side wall section and by the outer rim of the disc-shaped recording medium housed in the main cartridge body portion, and a second capacity discriminating hole towards the outer rim of the disc-shaped recording medium housed in the main cartridge body portion in proximity to the first positioning reference hole.

The first and second positioning reference holes and the first and second capacity discriminating holes of the mistaken recording inhibiting unit are at least holes formed in the lower surface of the main cartridge body portion.

The main cartridge body portion includes a recording and/or reproducing aperture in each of the upper and lower surfaces thereof for radially exposing to outside a portion of signal recording area of the disc-shaped recording medium from the front wall section to the vicinity of the mid portion thereof, and a shutter member movably mounted along the front wall section for opening/closing the recording and/or reproducing aperture.

The positioning reference hole and the first and second capacity discriminating holes are arranged substantially in a row along one of the sidewall sections of the main cartridge body portion. The mistaken recording inhibiting unit is arranged on the opposite sidewall section of the main cartridge body portion.

The first positioning reference hole is of the shaped of a true circle and the second positioning reference hole is of the shape of an ellipsis having its long axis extending in a direction perpendicular to the direction of insertion/detachment to or from the disc drive device.

By the distributed arrangement of the first and second capacity discriminating holes detected by the thrust type detection switch and the mistaken recording inhibiting holes of the mistaken recording inhibiting unit in the disc cartridge according to the present invention, uniform thrusting on detection switches arranged in distributed fashion can be realized by the thrusting pressure of the thrusting supporting mechanism adapted for thrusting and supporting the disc cartridge, thus enabling reliable detection of the recording capacity of the disc-shaped recording medium or the state of the disc cartridge by a small-sized detection switch.

Other objects and advantages of the present invention will become more apparent from the following description of the preferred embodiments and the claims.

BEST MODE FOR CARRYING OUT THE INVENTION

Figure 1:
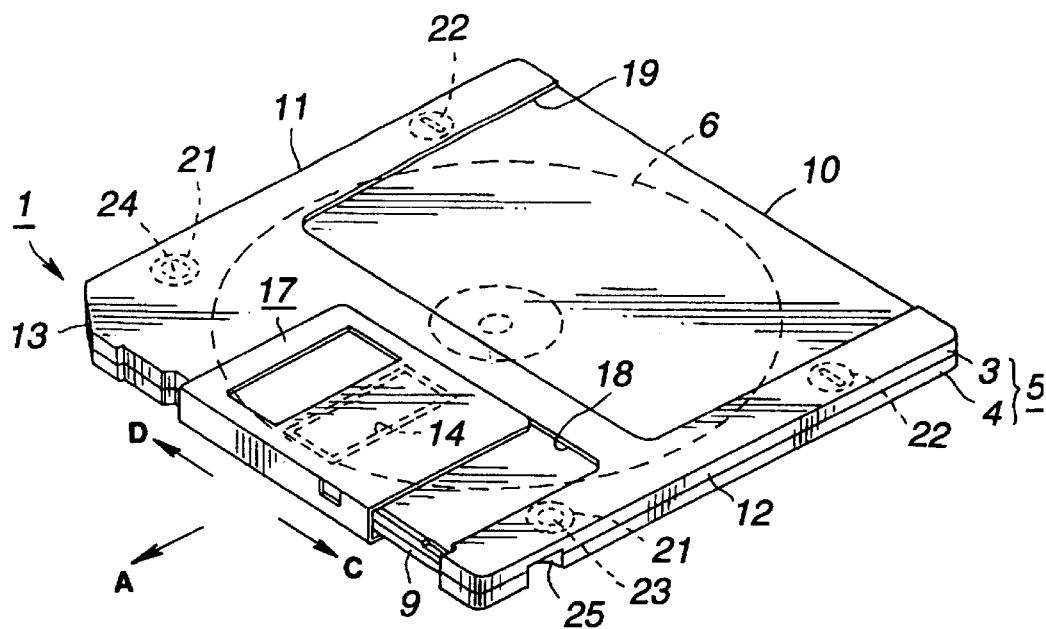
FIG. 1 is a perspective view of a first disc cartridge holding a magnetic disc of a recording capacity of 1 MB, looking from the upper surface side.
Figure 2:
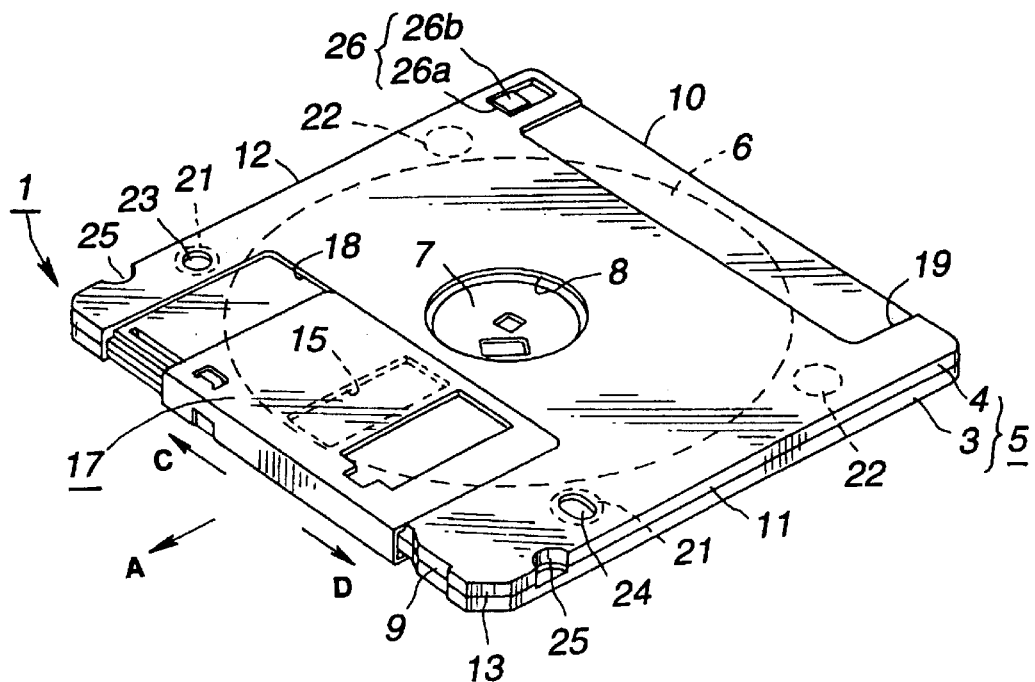
FIG. 2 is a perspective view of the disc cartridge of FIG. 1, looking from the lower surface side.
Figure 3:
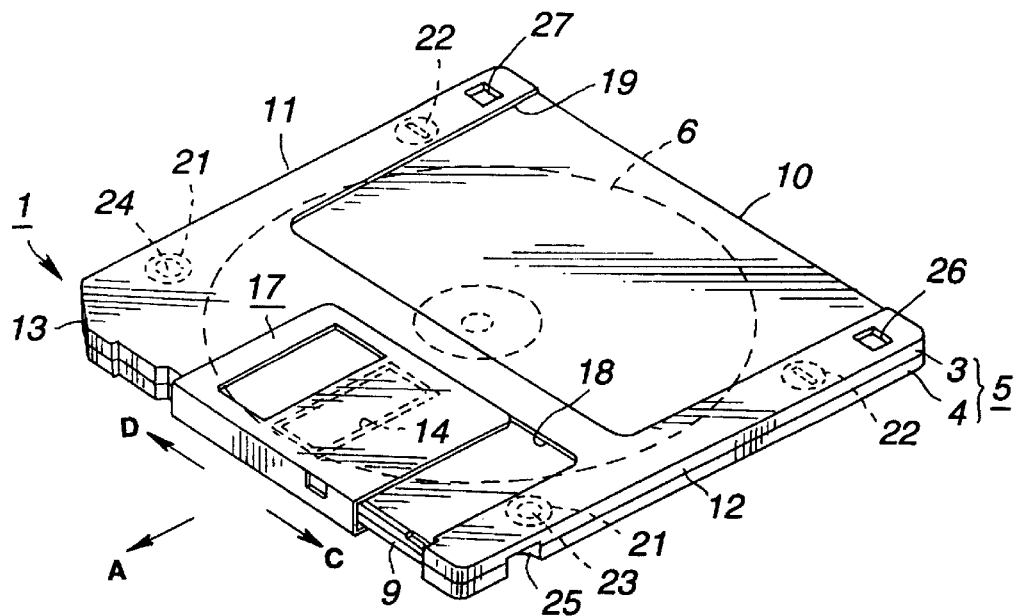
FIG. 3 is a perspective view of a first disc cartridge holding a magnetic disc of a recording capacity of 1 MB, looking from the lower surface side.
Figure 4:
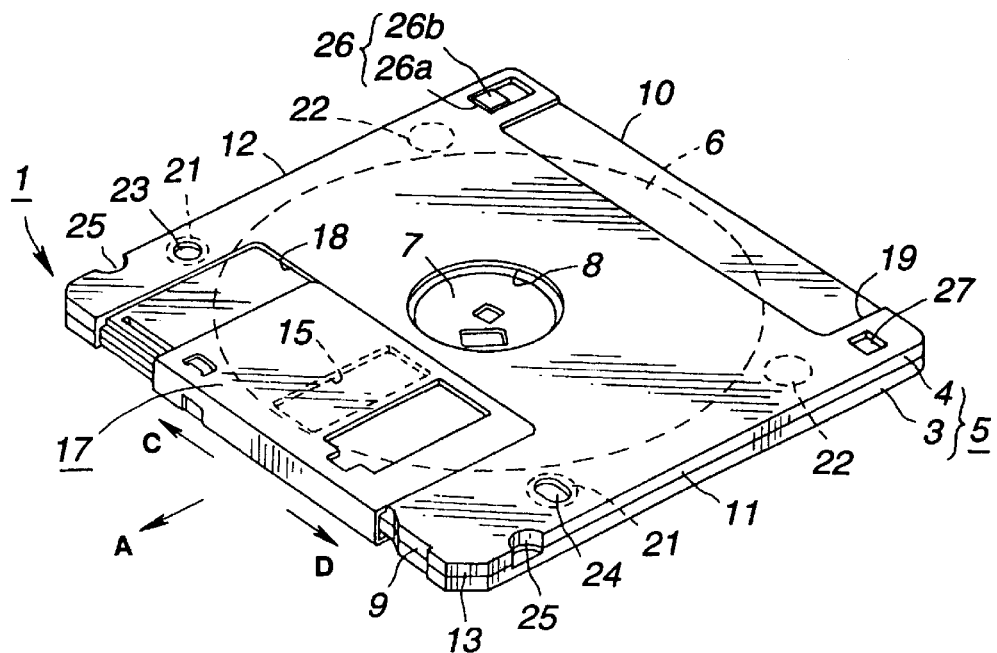
FIG. 4 is a perspective view of the disc cartridge of FIG. 1, looking from the upper surface side.

Referring to the drawings, a disc cartridge according to the present invention is explained in detail.

Figure 7:
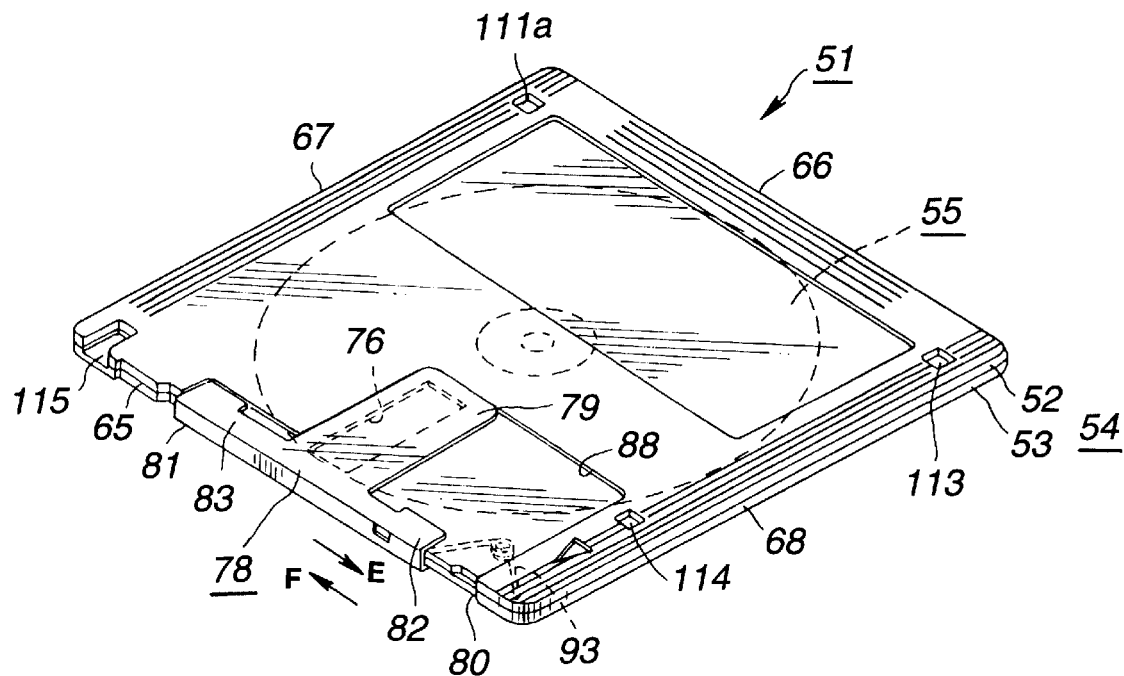
FIG. 7 is a perspective view of a disc cartridge according to the present invention, looking from the upper surface side.
Figure 8:
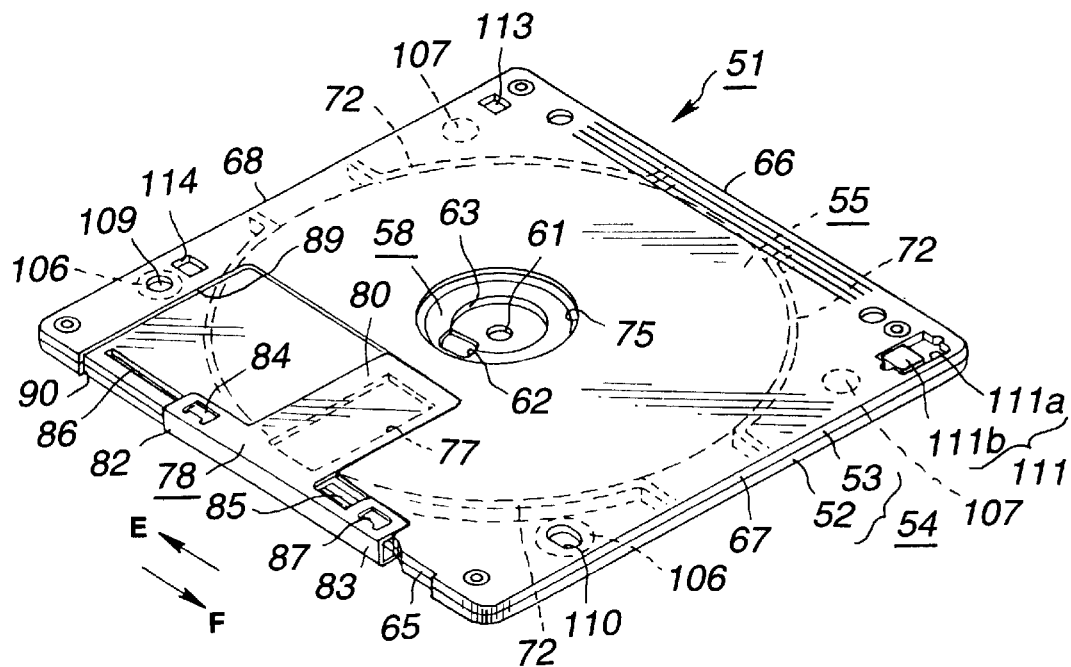
FIG. 8 is a perspective view of the disc cartridge of FIG. 7 looking from the upper surface side.
Figure 9:
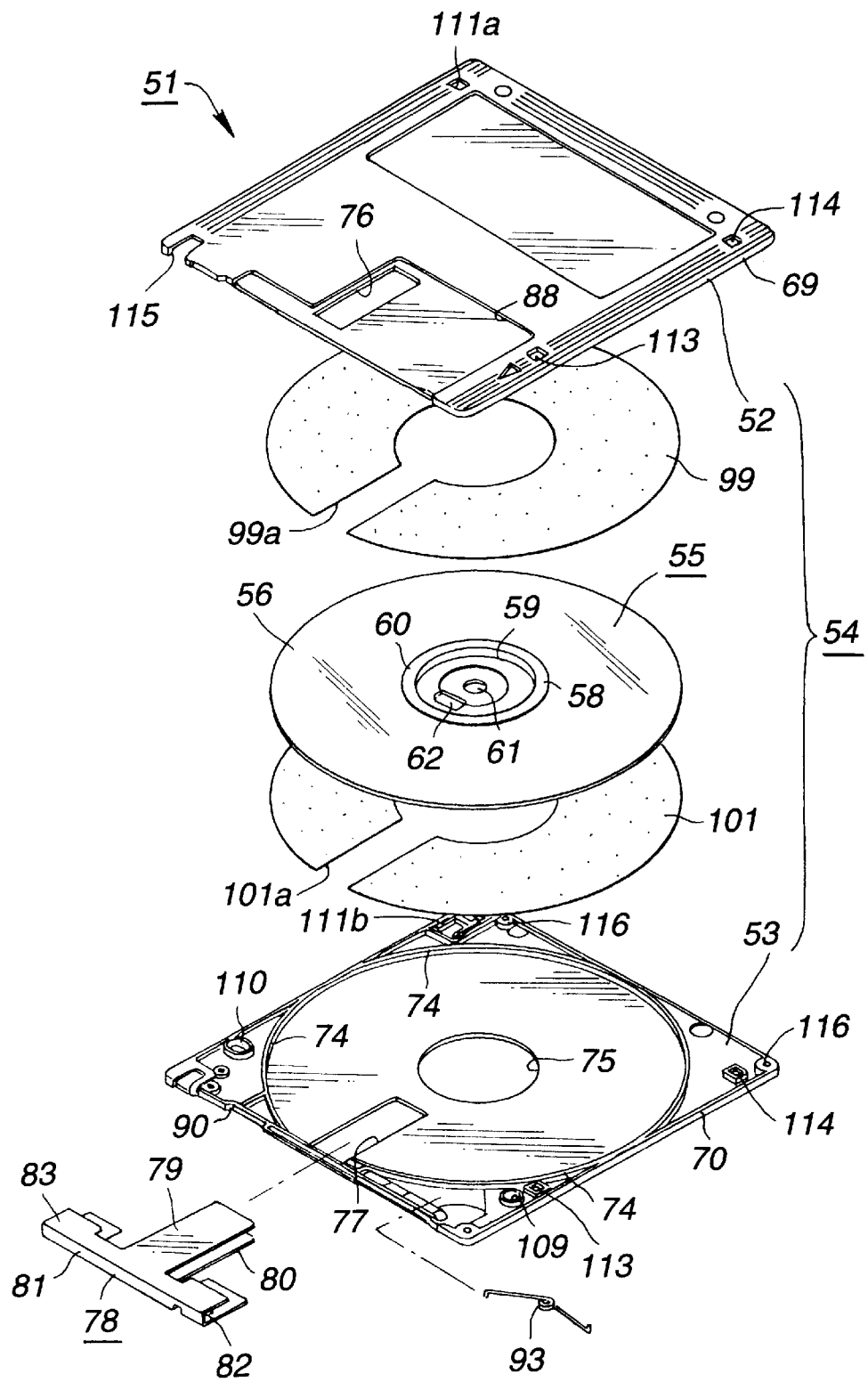
FIG. 9 is an exploded perspective view of the disc cartridge of FIG. 7.

A disc cartridge 51 according to the present invention includes a main cartridge body portion 54, comprised of an upper half 52 and a lower half 53 abutted and combined to each other, as shown in FIGS. 7 to 9. These halves 52, 53 are substantially rectangular in profile and obtained on injection molding of a synthetic resin material. Within this main cartridge body portion 54 is housed a magnetic disc 55 operating as a recording medium for information signals.

The magnetic disc 55 includes a main disc member 56, with a diameter of approximately 3.5 inch, comprised of a thin flexible film of a synthetic resin and a magnetic layer formed on both sides of the thin film. The main disc member 56 has a center aperture 57, as shown in FIG. 9. In this center aperture 57 is snugly fitted a hub or a center core 58. The center core 58 is formed of a magnetic material, such as metal, such that, when the magnetic disc 5 is loaded on the disc rotating/driving unit mounted on the disc drive device, the center core 58 is magnetically attracted by a magnet provided on the disc rotating/driving unit.

Referring to FIG. 9, the center core 58 has a flat tubular swollen-out portion 59 at its mid portion. The upper end of the swollen-out portion 59 is formed as-one with a flange 60 operating as a mounting portion on the main disc member 56. In the bottom surface of the swollen-out portion 59 are bored a spindle shaft engagement hole 61 and a driving pin engagement hole 62. In the spindle shaft engagement hole 61 and in the driving pin engagement hole 62 are engaged a spindle shaft of the disc rotating/driving unit and a driving pin provided on the disc rotating/driving unit, respectively.

The center core 58 is mounted on the main disc member 56 by fitting the swollen-out portion 59 in the center aperture 57 of the main disc member 56, setting the flange 60 on one surface of the main disc member 56 and by bonding the flange 60 to the main disc member 56 with an adhesive.

The magnetic disc 5 has a recording capacity of not less than 100 MB and is loaded on the disc rotating/driving unit so as to be rotated at an rpm exceeding 3000 rpm.

The main cartridge body portion 54, holding the magnetic disc 55, as described above, is constituted by abutting and bonding the upper and lower halves 52, 53 to each other, as shown in FIGS. 7 to 9. These paired halves 52, 53 are substantially rectangular in profile and are molded by injection molding of synthetic resin. On the outer rims of the upper and lower halves 52, 53 making up the main cartridge body portion 54 are formed upstanding wall sections 69, 70 abutted to each other for providing a front wall section 65, a back side wall section 66 and facing lateral wall sections 67, 68 of the main cartridge body portion 54, as shown in FIG. 9.

Figure 10:
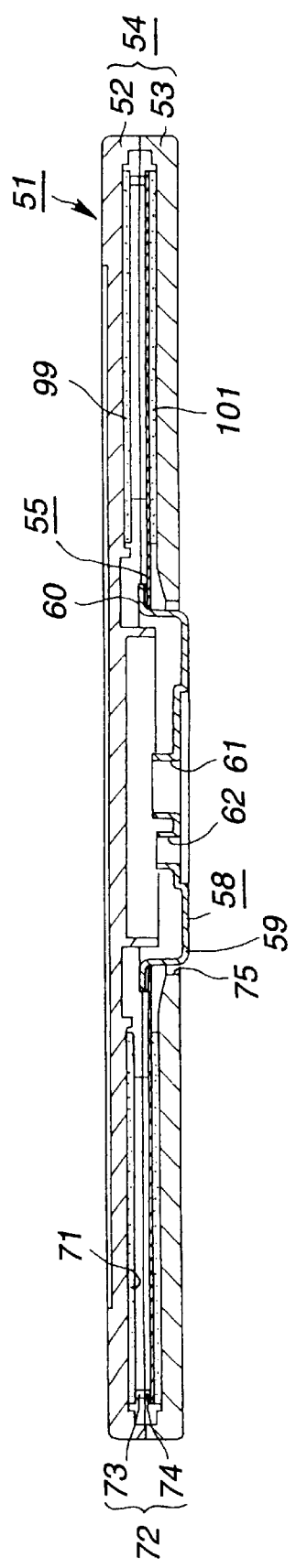
FIG. 10 is a cross-sectional view of a disc cartridge according to the present invention.

On facing inner sides of the upper half 52 and the lower half 53, there are formed upright partitioning wall defining wall sections 73, 74 constituting a partitioning wall section 72 delimiting a disc housing section 71 adapted for rotatably housing a magneto-optical disc 55, as shown in FIG. 10. These partitioning wall defining wall sections 73, 74 are arcuately shaped to inscribe the rectangular-shaped upper and lower halves 51, 52 and are abutted to each other to form the partitioning wall section 72 as shown in FIG. 10. The disc housing section 71 is an area confined by this partitioning wall section 72. Since the partitioning wall section 72 constituting the disc housing section 71 is defined by abutting the arcuately-shaped partitioning wall defining wall section 73, 74 inscribing the rectangular-shaped upper and lower halves 51, 52, the partitioning wall section 72 encircles the substantially entire rim of the magnetic disc 55 housed within the disc housing section 71.

Centrally of the lower half 53, making up the lower surface of the main cartridge body portion 54, there is formed a circular-shaped center aperture 75 adapted for exposing to outside the swollen-out portion 59 of the hub 58 mounted on the magnetic disc 55 housed within the main cartridge body portion 54. The center aperture 75 is formed only in the lower half 53, while the central portion of the upper surface of the main cartridge body portion 52 constituted by the upper half 52 is closed, as shown in FIGS. 7 and 8.

In the upper half 52 making up the upper surface of the main cartridge body portion 54, and in the lower half 53, there are formed first and second recording and/or reproducing apertures 76, 77 which are in register with each other and which are adapted for exposing to outside at least a portion of the signal recording area of the magnetic disc housed within the main cartridge body portion 54, as shown in FIGS. 7 to 9. These recording/reproducing apertures 76, 77, substantially rectangular in shape, are disposed at a mid portion in the left-and-right direction of the main cartridge body portion 54 and are extended from the vicinity of the center aperture 75 to the vicinity of the front wall section 65 of the main cartridge body portion 54. These first and second recording and/or reproducing apertures 76, 77 are formed for extending from the disc housing section 71 to a position proximate to the front wall section 65 so that the magnetic head of the recording/reproducing means for information signals, intruded into the main cartridge body portion 54, will be able to scan the magnetic disc 55 housed in the main cartridge body portion 54 via these apertures 76, 77 as far as the outer rm of the magnetic disc 55, as shown in FIG. 9.

On the main cartridge body portion 54 is movably mounted a shutter member 78, adapted for opening/closing the first and second recording and/or reproducing apertures 76, 77, as shown in FIGS. 7 and 8. This shutter member 78, formed by segmenting and warping a thin metallic sheet, includes a first shutter section 79, a second shutter section 80 and a connection plate section 81, as shown in FIG. 9. The first shutter section 79 is adapted for opening/closing the first recording and/or reproducing aperture 76 formed in the upper surface of the main cartridge body portion 54, while the second shutter section 80 is adapted for opening/closing the second recording and/or reproducing aperture 77 formed in the lower surface of the main cartridge body portion 54. The connection plate section 81 interconnects the proximal ends of the first and second shutter sections 79, 80 substantially parallel to each other. The connection plate section 81 is configured for being protruded on both sides of the first and second shutter sections 79, 80, so that, when the shutter member 78 is mounted on the main cartridge body portion 54, the connection plate section 81 will be extended along the front wall section 65 of the main cartridge body portion 54. These protruded portions are formed with first and second cartridge holding portions 82, 83. These cartridges holding portions 82, 83 are formed as lugs U-shaped in cross-section for fitting on the front wall section 65 of the main body portion 54. Specifically, these lugs are formed on opposite sides of the connection plate section 81 interconnecting the first and second shutter sections 79, 80 for extending in the direction of extension of the first and second shutter sections 79, 80, as shown in FIGS. 7 and 8. These lugs, making up the first and second cartridge holding portions 82, 83, and extending parallel to the second shutter section 80, are partially segmented to form a pair of engagement pieces 86, 87 configured for engaging with movement guide grooves 84, 85 which are formed in the lower surface of the main cartridge body portion 54 for extending on both sides of the second recording/reproducing aperture 77.

The above-described shutter member 78 is mounted on the main cartridge body portion 54 by fitting the first and second shutter sections 79, 80 on the main cartridge body portion 54 from the front wall section 65 for extending over the first and second recording/reproducing apertures 76, 77, respectively, fitting the first and second cartridge holding positions 82, 83 on the front wall section 65 of the main cartridge body portion 54 and by engaging the engagement pieces 86, 87 in the movement guide grooves 84, 85, respectively, as shown in FIGS. 7 and 8. The shutter member 78, thus mounted on the main cartridge body portion 54, is moved in the direction indicated by arrows E and F in FIGS. 7 and 8, between a position in which the first and second shutter sections 79, 80 close the first and second recording/reproducing apertures 76, 77, respectively, and a position in which the first and second shutter sections 79, 80 open the first and second recording/reproducing apertures 76, 77, respectively, with the engagement pieces 86, 87 being guided by the movement guide grooves 84, 85.

In the upper and lower surfaces of the main cartridge body portion 54, there are formed shutter movement recesses 88, 89 for extending from the rim of the first and second recording/reproducing apertures 76, 77 towards the sidewall section 66 of the main cartridge body portion 54, as shown in FIGS. 7 and 8. In the front wall section 65 of the main cartridge body portion 54, a movement recess 90, corresponding in depth to the thickness of the connection plate section 81 is formed over a movement range of the shutter member 78. The shutter member 78 is mounted substantially flush with the main cartridge body portion 54, without presenting any protruding portion from the surface of the main cartridge body portion 54, by having the first and second shutter sections 79, 80 in the shutter movement recesses 88, 89, and by engaging the connection plate section 81 in the movement recess 90.

The shutter member 78, mounted on the main cartridge body portion 54, is biased in the direction of closing the first and second recording/reproducing apertures 76, 77, as indicated by arrow F in FIGS. 7 and 8, by a torsion coil spring 93, which is a biasing member arranged in the main cartridge body portion 54. This torsion coil spring 93 is arranged at a corner of the main cartridge body portion 54 in which the shutter member 78 is located when opening the first and second recording/reproducing apertures 76, 77, as shown in FIG. 9. This torsion coil spring 93 has its one end and its other end retained by the main cartridge body portion 54 and by a spring retainer provided in the first cartridge holding portion 82, respectively, for biasing the shutter member 78 in the direction of closing the first and second recording/reproducing apertures 76, 77, as indicated by arrow F in FIGS. 7 and 8.

On the planar inner sides of the upper half 52 and the lower half 53 are arranged protective sheets 99, 101 for the magnetic disc 55, formed of, for example, a non-woven cloth or a lubricious sheet. These protective sheets 99, 191 are directly bonded to the inner surfaces of the upper and lower halves 52, 53 by heat fusion, ultrasonic bonding or an adhesive. Since the protective sheets 99, 101 are directly bonded to the flat inner surfaces of the upper and lower halves 52, 53, the sides of the upper and lower halves 52, 53 facing the main disc member 56 present planar surfaces.

The portions of the protective sheets 99, 101 in register with the first and second recording/reproducing apertures 76, 77 are cut out at 99a, 101a for opening the apertures, as shown in FIG. 9.

Within the main cartridge body portion 54, formed by abutting the upper and lower halves 52, 53, in which the protective sheets 99, 101 are arranged to present planar surfaces facing the main disc member 56, there is defined the disc housing section 71, spacious enough to permit rotation of the magnetic disc 55 without contacting with the inner surface of the main cartridge body portion 51, as shown in FIG. 10.

The upper and lower halves 52, 53 make up the main cartridge body portion 54 by abutting welding bosses 116, provided at the corners of the inner surfaces of the halves 52, 53, by abutting the upstanding wall sections 69, 70 and by welding the welding bosses 116 and the upstanding wall sections 69, 70 by, for example, ultrasonic welding, as shown in FIG. 9.

Figure 11:
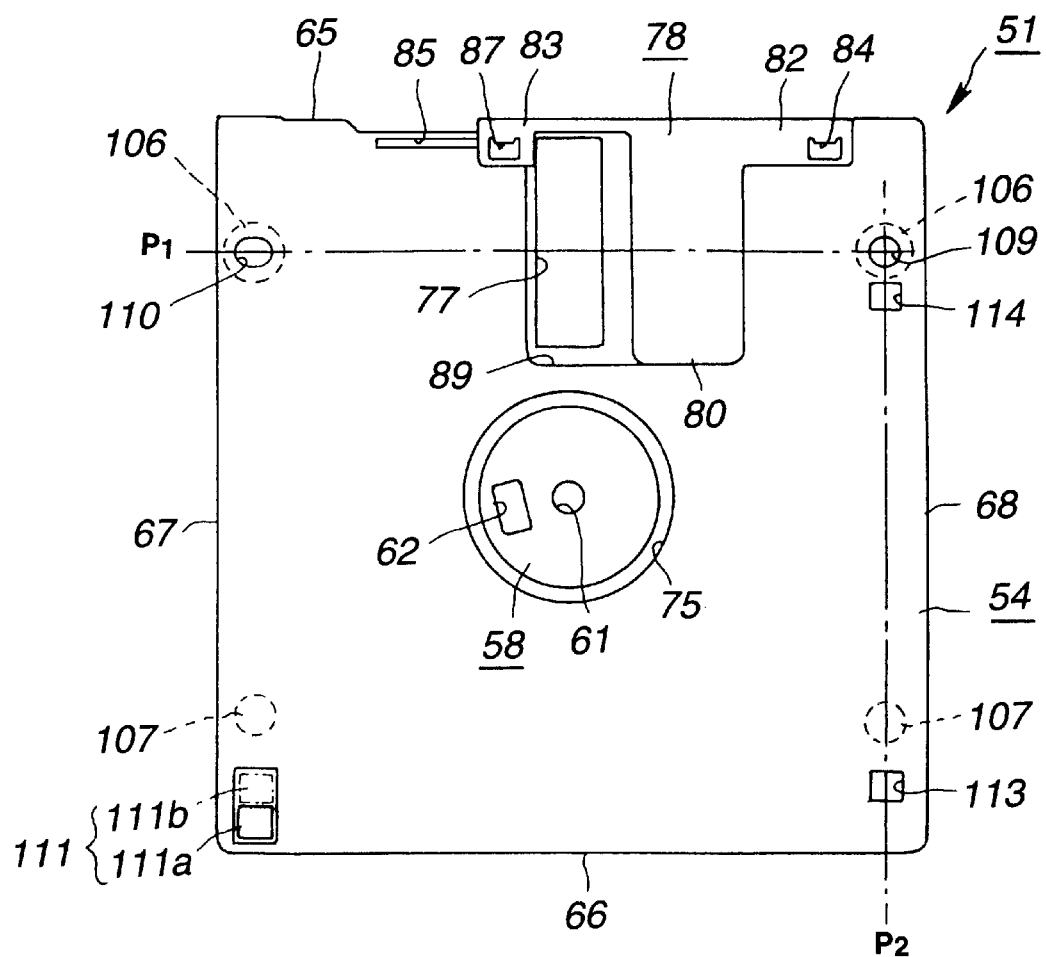
FIG. 11 is a bottom plan view showing the lower surface of the disc cartridge according to the present invention, with a recording and/or reproducing aperture being opened.

The lower surface of the main cartridge body portion 54 of the disc cartridge 51 according to the present invention is formed with first and second positioning reference holes 109, 110, engaged by positioning pins, not shown, provided on the disc drive device for setting the loading position of the disc cartridge 51, as shown in FIGS. 8 and 11. These positioning reference holes 109, 110 are formed towards the front wall section 65 on both sides in the direction of movement of the shutter member 78. The first positioning reference hole 109 is a circular hole corresponding to the positioning pin of a circular cross-section, while the second positioning reference hole 110 is shaped as an ellipsis having its long axis extending along the direction of movement of the shutter member 78 for enabling correction of the engagement position of the positioning pin therein. The rim of the first and second positioning reference holes 109, 110 is designed for operating as height setting planes 106, 106 carried by supports provided on the disc drive device for setting the loading height level when the disc cartridge 51 is loaded therein. Similar height level setting planes 107, 107 are provided at the corners towards the back side wall section 66 for setting the loading height level on loading the disc cartridge 51 on the disc drive device.

The first and second positioning reference holes 109, 110 are formed with the centers thereof substantially coincident with a longitudinal centerline $P_1$ passing through the centers of the recording and/or reproducing apertures 76, 77 leading to the front wall section 65 of the main cartridge body portion 54 so that the first and second positioning reference holes 109, 110 will be symmetrical relative to the center line in the left-and-right direction of the main cartridge body portion 54. By providing the first and second positioning reference holes 109, 110 in this manner, the portions of the magnetic disc 55 housed in the main cartridge body portion 54 lying on the centerline along the radius of the magnetic disc 55 are supported by the positioning pins, so that magnetic disc 55 chucked by the disc rotating/driving unit is correctly positioned relative to the main cartridge body portion 54 to make possible rotation of the magnetic disc 55 in a manner free of contact with the inner surface of the main cartridge body portion 54.

At a corner on the lower surface of the main cartridge body portion 54, located towards the sidewall section 67 towards the back side wall section 66, there is provided a mistaken recording inhibiting unit 111, as shown in FIGS. 8 and 11. The mistaken recording inhibiting unit 111 is arranged between the back side wall section 66 of the main cartridge body portion 54 and a height reference plane 107 and is comprised of a recording inhibition discriminating hole 111a and a mistaken recording preventive member 111b, as shown in FIGS. 8 and 11. The recording inhibition discriminating hole 111a is passed through the upper and lower halves 52, 53 making up the main cartridge body portion 54, while the mistaken recording preventive member 111b is movably assembled between the upper and lower halves 52, 53 for opening/closing the recording inhibition discriminating hole 111a. The mistaken recording inhibiting unit 111 opens or closes the recording inhibition discriminating hole 111a bored in the main cartridge body portion 54 by the mistaken recording preventive member 111b by way of making a selection between the state enabling recording of information signals on the magnetic disc 55 and the state obstructing recording of information signals.

At the opposite side corner in the lower surface in the main cartridge body portion 54 towards the opposite sidewall section 68 towards the back side wall section 66, and in the vicinity of the first positioning reference hole 109, there are provided first and second capacity discrimination holes 113, 114, specifying the recording capacity of the magnetic disc 55 housed in the disc cartridge 51, as shown in FIGS. 8 and 11. The first capacity discrimination hole 113 is provided at the opposite corner towards the opposite sidewall section 68 towards the back side wall section 66. Specifically, the first capacity discrimination hole 113 is provided at a position of left-and-right symmetry with respect to the recording inhibition discriminating hole 111a provided on one corner side. The first capacity discrimination hole 113 of the disc cartridge 51 of the present invention is provided in an opposite position in the left-and-right direction relative to the first capacity discrimination hole 27 provided in the aforementioned second disc cartridge 2.

Also, the second capacity discrimination hole 114 is provided in proximity to the first positioning hole 109, that is at a separation of the order of 2 to 4 mm, from the first positioning hole 109, in a side-by-side relation with respect to the insertion/detachment direction of the disc cartridge 51 to or from the disc drive device. That is, the second capacity discrimination hole 114 is located closer to the back side wall section 66 than the first positioning hole 109.

The first positioning hole 109, second capacity discrimination hole 114 and the first capacity discrimination hole 113 are provided along the opposite sidewall section 68 of the main cartridge body portion 54 so that the respective centres are substantially coincident with one another. Specifically, the first positioning hole 109, second capacity discrimination hole 114 and the first capacity discrimination hole 113 are provided so that the respective centres will lie on a straight line $P_2$ extending parallel to the opposite sidewall section 68 of the main cartridge body portion 54, as shown in FIG. 11.

In a corner on the upper surface towards the front wall section 65 of the main cartridge body portion 54, there is provided a loading control section 115 for inhibiting loading of the disc cartridge 51 of the present invention on a disc drive device dedicated to a disc cartridge holding a magnetic disc having a recording capacity different from that of the magnetic disc 55 of the disc cartridge 51. This loading control section 115 is formed as a recess adapted for opening the front wall section 65 of the main cartridge body portion 54.

A disc drive device 230, which makes possible interchangeable use of the first disc cartridge 1 housing a magnetic disc 6 with a recording capacity of 1 MB, second disc cartridge 2 housing a magnetic disc 6 with a recording capacity of 2 MB and the disc cartridge 51 housing the magnetic disc 55 having the recording capacity exceeding 100 MB according to the present invention, is hereinafter explained.

The portions of the disc drive device 230 having the basic structure in common with that of the disc drive device 30 employing the first and second disc cartridges 1 and 2 holding the magnetic disc 6 of the recording capacities of 1 or 2 MB, are depicted by the common reference numerals, and detailed description therefor is omitted for simplicity.

The disc drive device 230 includes a second capacity detection switch 243 adapted for detecting the second capacity discrimination hole 114 of the disc cartridge 51 holding the magnetic disc 55 of the increased capacity according to the present invention. This second capacity detection switch 243 is provided closer to the cartridge inserting/detachment opening 43 of the main body portion 31 than the first positioning pin 38 intruded into the first positioning reference hole 109. Similarly to the cartridge loading detection switch 44, mistaken recording detection switch 45 and the first capacity detection switch 46, the second capacity detection switch 243 is designed as a thrusting type switch having a thrusting element 243a.

Figure 12:
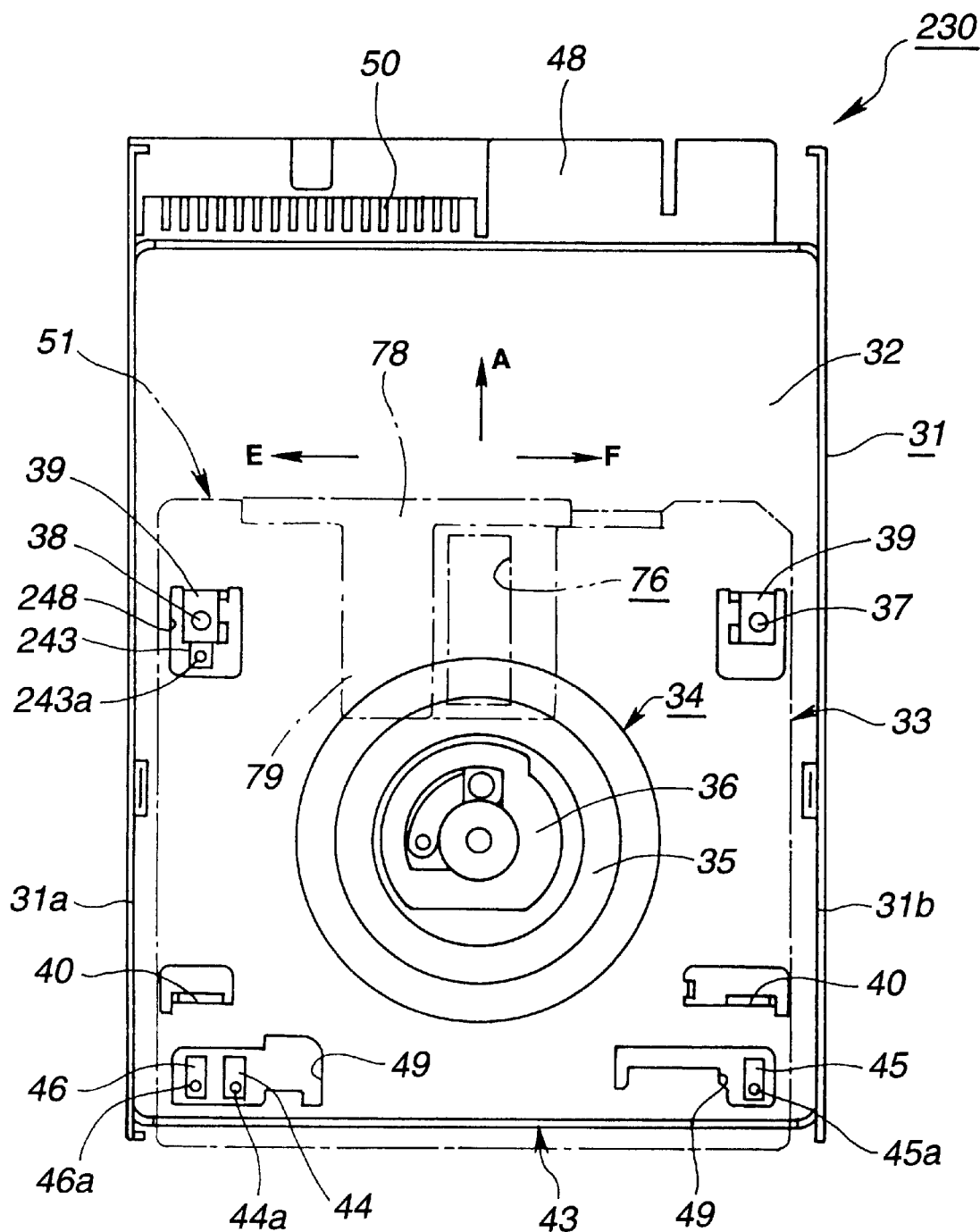
FIG. 12 is a plan view showing the state in which a disc cartridge according to the present invention is loaded on a disc drive device in which the first or second disc cartridge and the disc cartridge according to the present invention can be loaded selectively.

Referring to FIG. 12, an opening 248 is formed by segmenting the support 39, having the first positioning pin 38 set thereon, and by warping the segmented portion towards the cartridge loading unit 33 formed on the upper surface of the base block 32. Thus, the thrusting element 243a set upright on the second capacity detection switch 243 can be approached sufficiently to the first positioning pin 38 to as close as only 2 to 4 mm by having the second capacity detection switch 243 mounted on the printed circuit board 48 from below into the opening 248 and to below the support 39. Therefore, the thrusting element 243a can accurately and reliably detect the second capacity discrimination hole 114 provided in the disc cartridge 51 according to the present invention.

Since the mistaken recording inhibiting unit 111 and the first capacity discrimination hole 113 for the disc cartridge 51 of the present invention are provided in inverted positions in the left-and-right direction with respect to the aforementioned first and second disc cartridges 1, 2, the mistaken recording detection switch 45 and the first capacity detection switch 46 of the disc drive device 230 are provided in inverted positions in the left-and-right direction with respect to the disc drive device 30.

Figure 13:
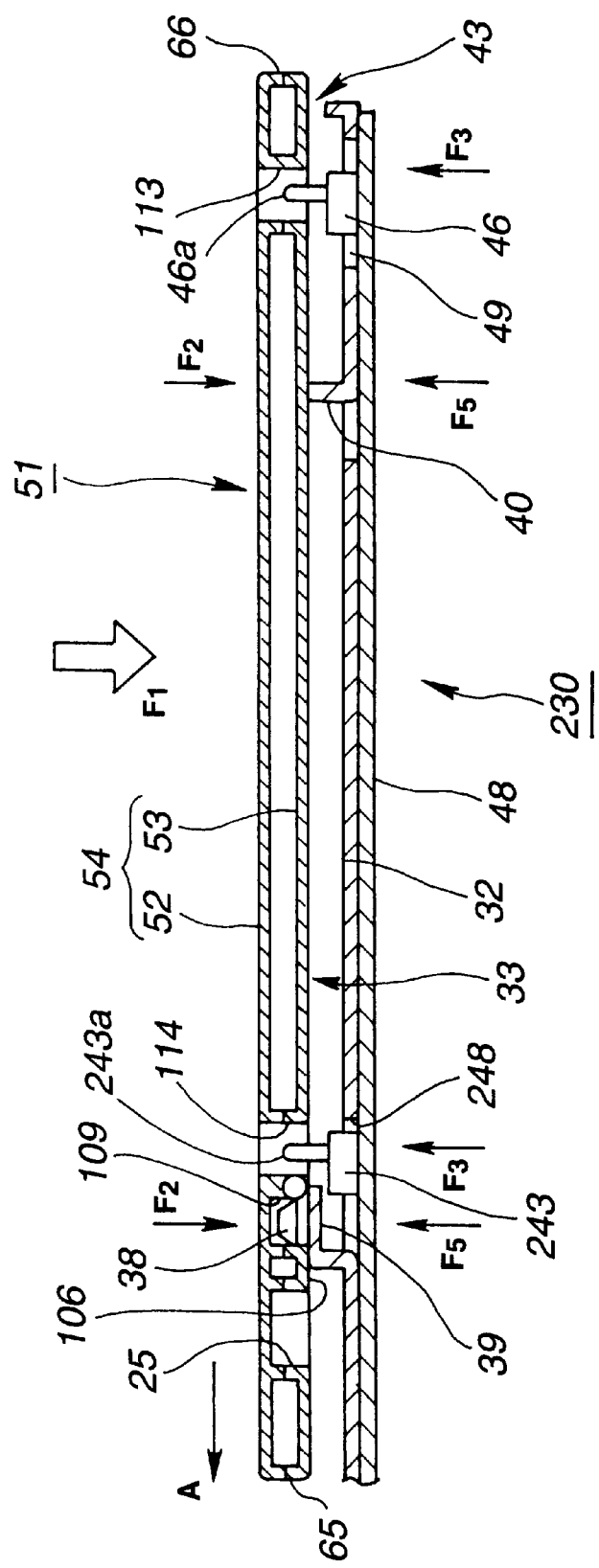
FIG. 13 is a cross-sectional side view showing the state in which a disc cartridge according to the present invention is loaded on a disc drive device in which the first or second disc cartridge and the disc cartridge according to the present invention can be loaded selectively.

The disc cartridge 51 and the disc drive device 230 enabling its loading, according to the present invention, are configured as described above, so that, if the disc cartridge of the present invention is loaded in the disc drive device 230 designed for interchangeably loading the disc cartridge 51 and the first and second disc cartridges 1, 2, it is loaded in position in a similar manner to the loading of the disc cartridges 1, 2, as shown in FIGS. 12 and 13. That is, the height reference planes 106, 107, provided at the corners on the lower surface of the main cartridge body portion 54, are pressed by the four supports 39, 40 of the disc drive device 230 from above, while the first and second positioning pins 37, 38 are engaged from below in the first and second positioning reference holes 109, 110. Thus, the disc cartridge 51 is loaded on the cartridge loading unit 33 provided on the base block 32, in such a manner that the main cartridge body portion 54 is correctly positioned along the height and in the horizontal direction. At this time, the magnetic disc 55 is chucked by the hub 58 on the disc table 36 on the disc rotating/driving unit 34, at the same time as the upper and lower paired magnetic heads, not shown, are introduced via the paired upper and lower recording and/or reproducing apertures 76, 77 into contact with the upper and lower surfaces of the magnetic disc 55. At this time, the first positioning reference hole 109 of the true circular shape is engaged by the first positioning pin 37 in a substantially play-free state, whilst the second positioning reference hole 110, having the shape of an ellipse, the long axis of which is the direction perpendicular to the direction of insertion into the disc drive device 230, as indicated by arrow A in FIG. 12, is loosely engaged by the second positioning pin 38 in a substantially play-free state in the cartridge inserting direction, although it has play in the long-axis direction. Therefore, the positioning reference (center of positioning) of the disc cartridge 51 of the present invention on the four height reference planes 106, 107 is the first positioning reference hole 109, so that the disc cartridge 51 according to the present invention is correctly positioned about the first positioning reference hole 109 as center by the first and second positioning reference holes 109, 110 in a two-dimensional direction defined by the direction of arrow A and the direction perpendicular thereto in FIG. 12.

The thrusting element 44a of the cartridge loading detection switch 44 is thrust downward by the lower surface of the main cartridge body portion 54 to turn on the switch to detect the loading of the disc cartridge 51 on the cartridge loading unit 33. The thrusting element 45a of the mistaken recording detection switch 45 detects the possible opening of the recording inhibition discriminating hole 111a of the mistaken recording inhibiting unit 111 to discriminate whether the current state is 'recording possible state' or 'the non-recordable state'. The thrusting element 243a of the second capacity detection switch 243 is intruded from below into the second capacity discrimination hole 114 to maintain the OFF state to discriminate that the magnetic disc 51 held in the disc cartridge 51 is of the large capacity type with the recording capacity exceeding 100 MB.

Since the second capacity discrimination hole 114 is provided in proximity to the first positioning reference hole 109, the mistaken recording detection switch 45, first capacity detection switch 46 and the second capacity detection switch 243 of the disc drive device 230 can be distributed at the three corners of the main cartridge body portion 54 of the disc cartridge 51 according to the present invention. Therefore, if the comprehensive pressing force $F_1$ applied from above for pressing the main cartridge body portion 54 to the sum total of four supports 39, 40 by the spring force of the thrusting spring provided in the cartridge loading unit as shown in FIG. 13 is 300 to 400 g, the distributed pressing force $F_2$ to the four supports 39, 40 is 90 to 100 g. Thus, if the thrusting force $F_3$ applied to each of the thrusting elements 45a, 46a, 243a of the mistaken recording detection switch 45, first capacity detection switch 46 and the second capacity detection switch 243 is approximately 36 g, the pressing force $F_3$ of approximately 36 g, applied to each of the thrusting elements 45a, 46a, 243a of the mistaken recording detection switch 45, first capacity detection switch 46 and the second capacity detection switch 243, can be distributed in a well-balanced fashion to the three corners of the main cartridge body portion 54.

Therefore, the cartridge uplifting force $F_5$ acting on each of the three height reference planes 106, 107, 107 in the vicinity of the three switches 45, 46, 243 on the lower surface of the main cartridge body portion 54 by the thrusting force $F_3$ applied by the thrusting elements 45a, 46a, 143a of the switches 45, 46, 243 is not larger than 36 g. It is noted that the combined force of the cartridge uplifting force $F_3$ applied by each of the thrusting elements 46a, 44a acts on the height reference plane 107 in the vicinity of the switches 46, 44, because the cartridge loading detection switch 44 is provided in the vicinity of the first capacity detection switch 46. However, this combined force is 2F=76 g or less.

The result is that the cartridge uplifting force $F_5$, applied to the sum total of four height reference planes 106, 107 on the lower surface of the main cartridge body portion 54 can be suppressed to a value smaller than the distributed pressing force $F_2$ of 90 to 100 g or less, applied to each of the sum total of the four supports 39, 40. Consequently, the cartridge floating phenomenon, in which the main cartridge body portion 54 pressed against the four supports 39, 40, is uplifted towards above from these supports, can be suppressed despite the fact that the number of the thrusting type detection switches of the disc drive device 230 is increased from three to four, as in the aforementioned disc drive device explained previously with reference to the prior art system. Thus, there is no risk of failure in chucking of the magnetic disc 55 to the disc table 36 or in rotational driving of the magnetic disc 55 otherwise caused by the cartridge floating phenomenon. Moreover, since there occurs no cartridge float phenomenon, detection of the possible presence of the loading of the disc cartridge 51 on the cartridge loading unit 33, decision as to recordability of information signals on the magnetic disc 51 or discrimination of the sort of the loaded disc cartridge, such as recording capacity, can be reliably made even if the movement stroke of the thrusting element is reduced in keeping with the tendency to reduction in thickness of the disc drive device 230.

In particular, the second capacity discrimination hole 114 is arranged in an extremely small space between the first positioning reference hole 109 and the outer rim of the magnetic disc 55. It is noted that the first criteria in setting the loading position of the main cartridge body portion 54 on the cartridge loading unit 33 in case the disc cartridge 51 of the present invention is loaded in the disc drive device 230 is the first positioning reference hole 109 engaged by the first positioning pin 38. Moreover, the inner diameter and the planarity of the lower surface about the rim of the first positioning reference hole 109 are set by machining to the maximum possible accuracy and to the maximum possible toughness for achieving the first criteria. The distributed pressing force $F_2$ with which the lower surface of the main cartridge body portion 54 presses the height reference plane 106 on a corner of the main cartridge body portion 54 formed with the first positioning reference hole 109 against the support 39 having the first positioning pin 38 set thereon is also set so as to be larger than the pressing force $F_2$ on the other three height reference planes 106, 107, 107. Therefore, by arranging the second capacity discrimination hole 114 in proximity to the first positioning reference hole 109, the relative position between the second capacity discriminating hole 114 and the second capacity detection switch 243 on the disc drive device 230 can be set to higher accuracy, so that, even if the second capacity discrimination hole 114 is smaller in size than the other discrimination holes because of space matching, the thrusting element 243a of the second capacity detection switch 243 can accurately discriminate the second capacity discrimination hole 114 at all times.

Also, if the aforementioned first and second disc cartridges are selectively loaded in the disc drive device 230 adapted for interchangeably using the disc cartridge 51 of the present invention and the first and second disc cartridges 1, 2, there occurs no cartridge floating phenomenon in which the height reference plane 21 of the first and second disc cartridges 1,2 are floated upward from the support 39 under the cartridge thrusting force $F_3$ of the thrusting element 243a of the second capacity detection switch 243.

Next, if the first disc cartridge 1 holding the magnetic disc 6 having the recording capacity of 1 MB is loaded on the disc drive device 230 adapted for enabling the disc cartridge 51 of the present invention to be interchangeably used with the aforementioned first and second disc cartridge 1, 2, the loading or non-loading of the disc cartridge on the cartridge loading unit 33 is detected in the same manner by the cartridge loading detection switch 44 as heretofore. However, the corner portion on the lower surface of the main cartridge body portion 5 presses down the thrusting element 243a of the second capacity detection switch 243 to turn on the switch 243 to discriminate that the recording capacity of the magnetic disc 6 is not larger than 100 MB. By the second capacity detection switch 243 being turned on, the objective of detection of the mistaken recording detection switch 45 and the first capacity detection switch 46 is switched such that the thrusting element 46a of the first capacity detection switch 46 detects recordability of the mistaken recording inhibiting unit 26 to discriminate the 'recordable state' or the 'non-recordable state', while the thrusting element 45a of the mistaken recording detection switch 45 is thrust downward by the opposite side corner by the lower surface of the main cartridge body portion 5 so as to be turned on to indicate that the recording capacity of the magnetic disc 6 is 1 MB.

Next, if the second disc cartridge 2 holding the magnetic disc 6 having the recording capacity of 2 MB is loaded on the disc drive device 230, the loading or non-loading state on the cartridge loading unit 33 is detected in the same manner by the cartridge loading detection switch 44 as heretofore. However, the corner portion on the lower surface of the main cartridge body portion 5 presses down the thrusting element 243a of the second capacity detection switch 243 to turn on the switch 243 to discriminate that the recording capacity of the magnetic disc 6 is not larger than 100 MB. By the second capacity detection switch 243 being turned on, the objective of detection of the mistaken recording detection switch 45 and the first capacity detection switch 46 is switched such that the thrusting element 46a of the first capacity detection switch 46 detects the opened or closed state of the mistaken recording inhibiting hole 26a to discriminate the 'recordable state' or the 'non-recordable state', while the thrusting element 45a of the mistaken recording detection switch 45 is thrust downward by the lower surface of the main cartridge body portion 5 so as to be inserted from below into the first capacity discrimination hole 27 on the opposite side corner to maintain the OFF state to indicate that the recording capacity of the magnetic disc 6 is 2 MB.

Meanwhile, the upper and lower magnetic heads, provided on the disc drive device 230 which enables the disc cartridge 51 of the present invention to be interchangeably used with the aforementioned first and second disc cartridges 1, 2, includes two magnetic gaps, namely a magnetic gap for recording and/or reproducing information signals on or from the magnetic discs 6 for 1 MB/2 MB and a magnetic gap for recording and/or reproducing information signals on or from the magnetic discs 55 for not less than 100 MB, and switches between these two magnetic gaps based on the recognition as to whether the recording capacity of the magnetic disc 6 or 55 is 1 MB/2 MB or not less than 100 MB, for selectively switching between recording and/or reproduction of information signals by the 1 MB/2 MB format and that by not less than 100 MB format.

Figure 5:
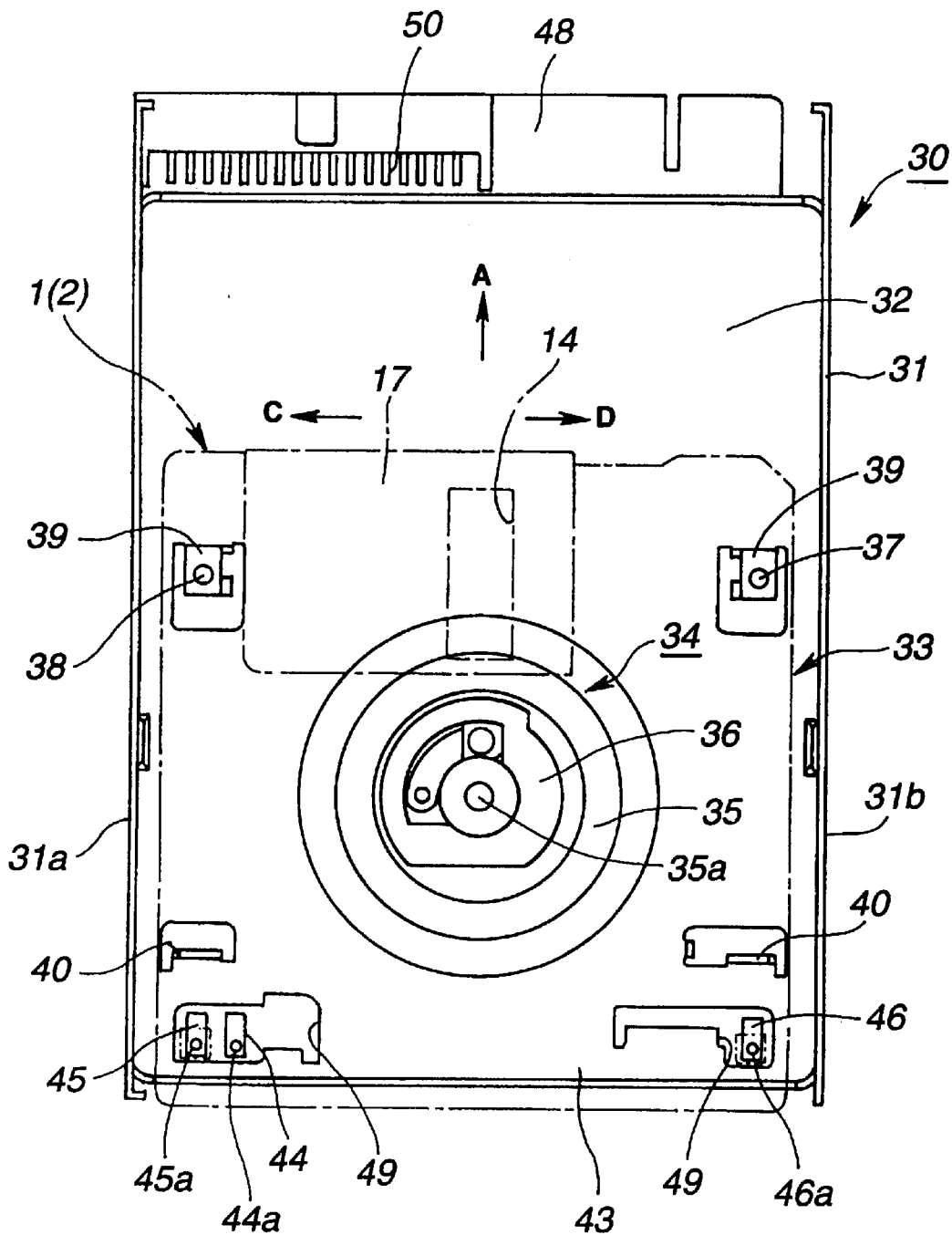
FIG. 5 is a plan view showing the state in which the first or second disc cartridge is loaded on a conventional disc drive device.
Figure 6:
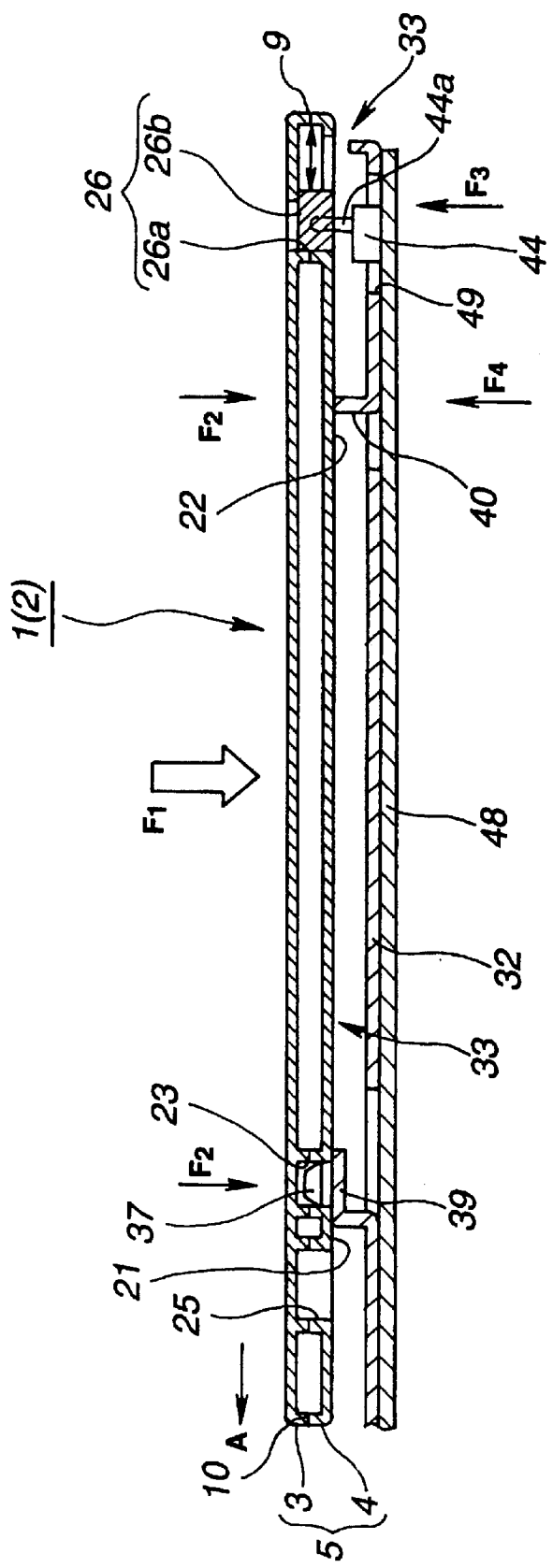
FIG. 6 is a cross-sectional side view showing the state in which the first or second disc cartridge is loaded on a conventional disc drive device.

It is noted that, in the disc cartridge 51 according to the present invention, the relative disposition of the mistaken recording inhibiting unit 111 and the first capacity discrimination hole 114 is reversed in the left-and-right direction from that of the mistaken recording inhibiting unit 26 and the first capacity discrimination hole 27 of the first disc cartridge 1 holding the magnetic disc 6 with the recording capacity of 1 MB or the second disc cartridge 2 holding the magnetic disc 6 with the recording capacity of 2 MB, so that, if the disc cartridge 51 of the present invention is erroneously loading on the disc drive device 30 of FIG. 5, the first capacity discrimination hole 113 of the disc cartridge 51 of the present invention is engaged by the thrusting element 45a of the mistaken recording detection switch 45 of the disc drive device 30 shown in FIG. 5 to maintain the mistaken recording detection switch 45 off at all times to allow the 'recording inhibiting state' to be recognized at all times. Therefore, the 'recording inhibiting state' can be recognized through the first capacity discrimination hole 113, without regard to whether the mistaken recording inhibiting unit 111 of the disc cartridge 51 of the present invention has been switched to the 'recordable state' or to the 'non-recordable state' to prevent inadvertent erasure of the information signals recorded on the magnetic disc 55 in case the disc cartridge 51 of the present invention is erroneously loaded on the disc drive device 30 shown in FIG. 5.

Although the present invention has been described with reference to reference to the illustrated embodiments, the present invention can be modified within the scope of the invention which is limited only by the claims. For example, the present invention can be applied to, for example, a variety of disc cartridges holding magnetic discs, optical discs or magneto-optical discs.

INDUSTRIAL APPLICABILITY

A disc cartridge according to the present invention includes a main cartridge body portion holding a disc-shaped recording medium of an increased capacity, first and second positioning reference holes formed at left and right corners in the lower surface of the main cartridge body portion encircled by the front wall section in the direction of insertion of the main cartridge body portion into a disc drive device, left and right sidewall sections extending perpendicular to the front wall section and the outer rim of the disc-shaped recording medium housed in the main cartridge body portion, a first capacity discriminating hole and a mistaken recording inhibiting unit provided at left and right corners encircled by the back side wall section of the main cartridge body portion, left and right sidewall sections extending perpendicular to the back side wall section and the outer rim of the disc-shaped recording medium housed in the main cartridge body portion and a second capacity discriminating hole towards the outer rim of the disc-shaped recording medium housed in the main cartridge body portion in proximity to the first positioning reference hole. The portions detected by the detection switches are arranged in a distributed fashion on the lower surface of the main cartridge body portion in order to detect reliably the state of the disc cartridges such as the sorts of the magnetic discs.

What is claimed is:

1. A disc cartridge comprising:
   a main cartridge body portion holding a disc-shaped recording medium of an increased capacity;
   first and second positioning reference holes formed at left and right corners in the lower surface of said main cartridge body portion encircled by the front wall section in the direction of insertion of the main cartridge body portion into a disc drive device, left and right sidewall sections extending perpendicular to the front wall section and the back side wall section and the outer rim of the disc-shaped recording medium housed in said main cartridge body portion;

a first capacity discriminating hole and a mistaken recording inhibiting unit provided at left and right corners encircled by the back side wall section of the main cartridge body portion;

a second capacity discriminating hole provided towards the outer rim of the disc-shaped recording medium housed in said main cartridge body portion in proximity to the first positioning reference hole; and wherein said first and second capacity discriminating holes and said first positioning reference hole are arranged along one of the left and right sidewall sections so that center portions thereof are substantially coincident with one another.

2. The disc cartridge as claimed in claim 1 wherein said first and second positioning reference holes and said first and second capacity discriminating holes are at least holes formed in the lower surface of said main cartridge body portion.

3. The disc cartridge as claimed in claim 1 wherein said main cartridge body portion includes a recording and/or reproducing aperture in each of the upper and lower surfaces thereof for radially exposing to outside a portion of signal recording area of the disc-shaped recording medium from the front wall section to the vicinity of the mid portion thereof, and a shutter member movably mounted along the front wall section for opening/closing the recording and/or reproducing aperture.

4. The disc cartridge as claimed in claim 1 wherein said first positioning reference hole and said first and second capacity discriminating holes are arranged substantially in a row along one of the sidewall sections of the main cartridge body portion and wherein said mistaken recording inhibiting unit is arranged on the opposite sidewall section of the main cartridge body portion.

5. The disc cartridge as claimed in claim 1 wherein said first positioning reference hole is of the shape of a true circle and said second positioning reference hole is of the shape of an ellipsis having its long axis extending in a direction perpendicular to the direction of insertion/detachment to or from the disc drive device.

6. The disc cartridge as claimed in claim 1 wherein said disc-shaped recording medium is a flexible magnetic disc having a recording capacity of not less than 100 MB.

* * * * *